UNITED STATES PATENT OFFICE.

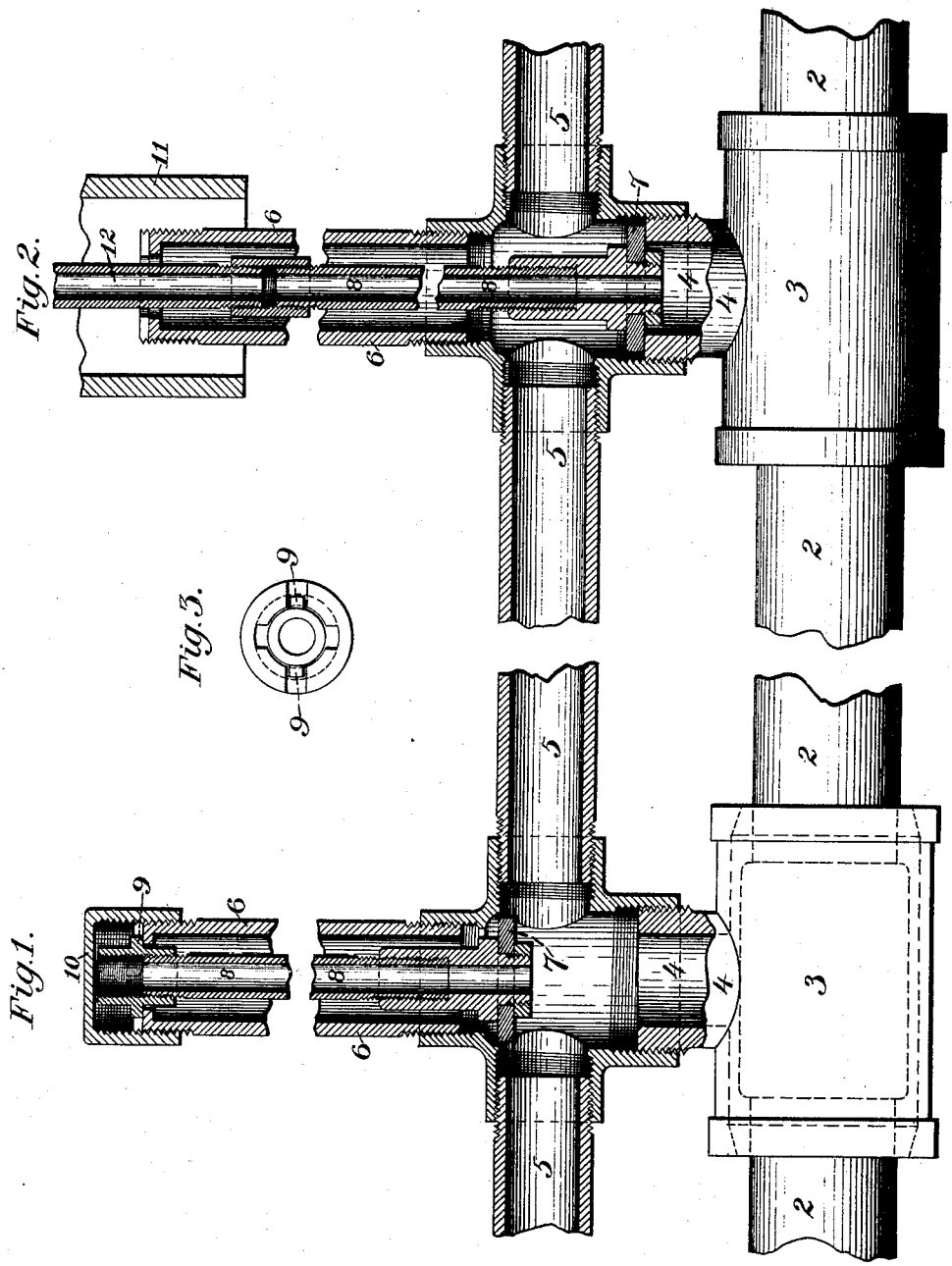

JAMES J. RICKETTS, OF PITTSBURG, PENNSYLVANIA.

LEAK-DETECTOR FOR GAS-MAINS.

SPECIFICATION forming part of Letters Patent No. 320,695, dated June 23, 1885.

Application filed May 11, 1885. (No model.)

*To all whom it may concern:*

Be it known that I, JAMES J. RICKETTS, of Pittsburg, in the county of Allegheny and State of Pennsylvania, have invented a new and useful Improvement in Leak-Detectors for Gas-Mains; and I do hereby declare the following to be a full, clear, and exact description thereof.

My invention relates to an improvement in the system of conduction and distribution of gas in underground pipes; and it consists in new and useful means for detection of leaks therein. It has been designed with especial reference to the distribution of natural gas, which is known to be difficult to confine, and because of its low temperature often causes the joints of the pipes to open, thereby producing disastrous accidents. The labor hitherto incident to the stoppage of such leaks and the imperfection of the means used in locating them have given rise to my invention.

I will now describe my improvement with reference to the accompanying drawings, in which Figure 1 is a vertical sectional view of the detector applied to a gas-main. Fig. 2 is a view of the same when the parts are differently situated. Fig. 3 is a top plan view of the tube 6 when the cap marked 10 has been removed.

Like figures of reference indicate like parts.

In the drawings, 2 represents an underground gas-pipe. It has been usual to fit loose jackets or sleeves around the joints of such pipes, so as to form a chamber meant to catch any leaking gas from the inclosed joints. A number of such chambers, being connected with a horizontal waste-pipe and communicating therethrough with a suitable discharge outlet, serve to carry away the gas and prevent its accumulation in any spot. I prefer to employ this system, or a part of it, in connection with my improved leak-detector. Thus, 3 represents a jacket surrounding one of the joints of the pipe 2, and 4 is a port or passage which leads from the chamber 3 into the horizontal leak-conduit 5 before mentioned. A vertical pipe, 6, in line with the port 4 forms a continuation thereof, and extends up to or toward the ground-surface. Its purpose is principally to serve as a casing for a valve-stem, hereinafter to be described.

As shown in the drawings, a cross-connection screwed at one end to the port 4, at the opposite end to the vertical pipe 6, and with its two side arms joined to the leak-conduit 5, connects the parts last mentioned. At or near the top of the port 4 is a valve-seat, upon which sits a valve, 7, whose stem 8 extends upward loosely through the vertical pipe. This stem is made hollow, so that it may serve as a leak-detecting pipe, and its bore extends through the valve proper, 7. When the valve is seated, its function is to shut off communication between the chamber 3 and leak-conduit 5, while it opens communication between the chamber and the hollow stem. Normally the valve is raised from its seat and kept raised either by means of turning the stem, so that lugs 9 thereon may engage a seat on the top of the pipe 6, or by any other suitable device. (See Fig. 1.) When the stem has been raised, it may be conveniently covered by a cap, 10, screwed upon the top of the pipe 6, and when thus arranged leakage from any of the joints will be carried through the conduit 5 into the discharge-pipe in the usual way.

If any improper amount of gas be discovered escaping from the discharge-pipe and it is desired to determine the place of the leak, in order to stop it, the plan of operation is as follows: The cap 10 of one of the vertical pipes 6 of the system is removed, the valve-stem 8 disengaged from its support on the pipe 6, and allowed to drop to its seat in the port 4. As before explained, the effect of this is to cut off the chamber 3 from the leak-conduit and discharge-pipe, and to put it into communication with the valve-stem 8. If, therefore, the leak be in the chamber under examination, the gas may be readily detected coming through the hollow stem 8; but if there be no leak in this joint gas will not pass through the stem, but may be perceived escaping through the pipe 6 around the stem. By examining the several vertical pipes of the system in succession the locus of the leak may be found. In most cases it will be convenient to extend the pipe 6 but a short distance from the jacket 3. This may be done by terminating the pipe within a vertical box, 11, constructed like the stop-cock boxes now in common use on gas-lines. The leak-detector may then be operated by unscrewing the cap 10 with a wrench inserted into the stop-cock box, and by screwing the end of a long tube, 12, into the open end of valve-stem 8, whereby the valve may be dropped and the leaking gas, if there be any, discovered coming through the tube 12, which is, in fact, a continuation of the hollow valve-stem. At the end of the operation the valve may be lifted, the valve-stem secured to the top of pipe 6, the tube 12 removed, the cap 10 reset, and the cover put upon the stop-cock box 11. By keeping the valve 7 permanently on its seat the stem may be used as a leak-detector without need of loosening or adjusting it in the manner before described.

I do not desire to limit the scope of my invention to its combination with a leak-discharge and a leak-conduit, 5, because the leak-detector may be applied to the leak-chamber around the joint without these parts, or used independently thereof. Neither do I limit myself to the employment of the drop-valve herein shown, but intend to include other forms of valve as well.

What I claim as my invention, and desire to secure by Letters Patent, is—

1. The combination, with a leak-chamber for collecting leaking gas from an underground gas-pipe, of a leak-detecting pipe leading thence toward the level of the ground, and a valve for opening and closing communication between the leak-chamber and said detecting-pipe, substantially as and for the purposes described.

2. The combination, with a leak-chamber for collecting leaking gas from an underground gas-pipe, of a leak-detecting pipe leading thence toward the level of the ground, a leak-conduit communicating with the chamber and discharging into the open air, and a valve for closing communication between the leak-conduit and the leak-chamber, and opening communication between the latter and the detecting-pipe, substantially as and for the purposes described.

3. The combination, with a leak-chamber for collecting leaking gas from an underground gas-pipe, of a leak-conduit leading thence, and a drop-valve for closing communication between the chamber and the leak-conduit, said valve provided with a hollow stem extending toward the level of the ground, whereby when the leak-conduit is closed from the chamber communication between the latter and the valve-stem is established, substantially as and for the purposes described.

In testimony whereof I have hereunto set my hand this 4th day of May, A. D. 1885.

JAMES J. RICKETTS.

Witnesses:
W. B. CORWIN,
THOMAS W. BAKEWELL.